(12) United States Patent
Stauder et al.

(10) Patent No.: US 11,138,795 B2
(45) Date of Patent: Oct. 5, 2021

(54) METHOD AND DEVICE FOR DETERMINING A CHARACTERISTIC OF A DISPLAY DEVICE

(71) Applicant: InterDigital CE Patent Holdings, SAS, Paris (FR)

(72) Inventors: Jurgen Stauder, Montreuil/Ille (FR); Philippe Robert, Rennes (FR); Sylvain Duchene, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 15/987,685

(22) Filed: May 23, 2018

(65) Prior Publication Data

US 2018/0342104 A1 Nov. 29, 2018

(30) Foreign Application Priority Data

May 23, 2017 (EP) ..................................... 17305600

(51) Int. Cl.
*G06T 19/00* (2011.01)
*G06T 7/514* (2017.01)
(Continued)

(52) U.S. Cl.
CPC .......... *G06T 19/006* (2013.01); *G06T 3/0012* (2013.01); *G06T 7/0002* (2013.01);
(Continued)

(58) Field of Classification Search
CPC .... G09G 5/02; G09G 5/06; G09G 2320/0666; G09G 2320/0626; G06T 11/001
See application file for complete search history.

(56) References Cited

U.S. PATENT DOCUMENTS 5,854,661 A 12/1998 Kochanski
7,133,083 B2 11/2006 Jaynes et al.
(Continued)

FOREIGN PATENT DOCUMENTS

CN 106373197 A 2/2017
CN 106506944 A * 3/2017
(Continued)

OTHER PUBLICATIONS

Liu et al., "The Effect of Ambiant Illumination on Handheld Display Image Quality", Journal of Digital Imaging, vol. 27, vol. 1, Feb. 2014, pp. 12-18.
(Continued)

*Primary Examiner* — Todd Buttram
(74) *Attorney, Agent, or Firm* — Invention Mine LLC (57) ABSTRACT

In a situation where a capturing device is capturing a first image of a scene comprising a display device displaying a second image, a salient idea is to send both the captured first image and the second image, being displayed by the display device to a processing device, for comparatively processing the first and the second image to determine a characteristic associated with the display device. Being able to process the first image (comprising a displayed second image) together with the original second image advantageously allows to determine various characteristics associated with the display device that altered the displayed second image within the first image, making it different from the initial second image. Characteristics associated with the display device are for example a specular reflection occurring on the display device in the scene and disturbing the capture of the scene.

25 Claims, 4 Drawing Sheets

(51) Int. Cl.
G06T 7/90 (2017.01)
G06T 3/00 (2006.01)
G06T 7/00 (2017.01)

(52) U.S. Cl.
CPC ............... *G06T 7/514* (2017.01); *G06T 7/90* (2017.01); *G06T 2207/10024* (2013.01); *G06T 2207/30121* (2013.01); *G06T 2207/30168* (2013.01)

(56) References Cited

U.S. PATENT DOCUMENTS

| | | | |
|---|---|---|---|
| 7,630,002 B2 | 12/2009 | Jenkins | |
| 7,907,790 B2 | 3/2011 | Inazumi | |
| 8,400,468 B2 | 3/2013 | Nelson | |
| 9,380,297 B1* | 6/2016 | Djurdjevic | G06T 7/80 |
| 2010/0091026 A1* | 4/2010 | Lin | G09G 3/006 |
| | | | 345/581 |
| 2011/0242332 A1* | 10/2011 | McFadyen | H04N 9/3194 |
| | | | 348/189 |
| 2013/0120589 A1* | 5/2013 | Chang | H04N 9/69 |
| | | | 348/189 |
| 2013/0147860 A1* | 6/2013 | Ishida | G09G 5/10 |
| | | | 345/690 |
| 2015/0123957 A1 | 5/2015 | Jun et al. | |
| 2015/0138326 A1* | 5/2015 | Park | H04N 13/133 |
| | | | 348/51 |
| 2015/0324163 A1* | 11/2015 | Kim | G09G 5/12 |
| | | | 345/2.3 |
| 2017/0262247 A1* | 9/2017 | Yoganandan | G06T 7/90 |

FOREIGN PATENT DOCUMENTS

| | | |
|---|---|---|
| EP | 2357610 | 9/2012 |
| WO | WO 2017182315 | 10/2017 |

OTHER PUBLICATIONS

Lowe, David G., "Distinctive Image Features from Scale-Invariant Keypoints", International Journal of Computer Vision, vol. 60, No. 2, Nov. 2004, pp. 91-110.

Chum et al., "Homography Estimation from Correspondences of Local Elliptical Features", 21st International Conference on Pattern Recognition (ICPR2012), Tsukuba, Japan, Nov. 11, 2012, pp. 3236-3239.

Dubrofsky, E., "Homography Estimation", Masters Thesis, University of British Columbia, Vancouver, Canada, Mar. 2009, 32 pages.

Summet et al., "Shadow Elimination and Blinding Light Suppression for Interactive Projected Displays", IEEE Transactions on Visualization and Computer Graphics, vol. 13, No. 3, May/Jun. 2007, 18 pages.

Pessoa et al., "RPR-SORS: Real-time Photorealistic Rendering of Synthetic Objects into Real Scenes", Journal of Computers & Graphics; vol. 36, Jan. 2012, pp, 50-69.

Sukthankar et al., "Dynamic Shadow Estimation for Multi-Projector Displays", 2001 IEEE Computer Society Conference on Computer Vision and Pattern Recognition (CVPR 2001), Kauai, Hawaii, USA, Dec. 8, 2001, pp. 151-157.

Park et al., "Specular Reflection Elimination for Projection-Based Augmented Reality", Fourth IEEE and ACM International Symposium on Mixed and Augmented Reality (ISMAR'05), Vienna, Austria, Oct. 5, 2005, 2 pages.

Mikolajczyk et al., "A Performance Evaluation of Local Descriptors", IEEE Transactions on Pattern Analysis and Machine Intelligence, vol. 27, No. 10, Oct. 2005, pp. 1615-1630.

Fischler et al., "Random Sample Consensus: A Paradigm for Model Fitting with Applications to Image Analysis and Automated Cartography", Communications of the ACM, Graphics and Image Processing, vol. 24, No. 6, Jun. 1981, pp. 381-395.

Elfros, A., "Feature Matching and RANSAC", CM University, Course 15-463: Computational Photography, Fall 2005, 43 pages.

* cited by examiner

METHOD AND DEVICE FOR DETERMINING A CHARACTERISTIC OF A DISPLAY DEVICE

1. REFERENCE TO RELATED EUROPEAN APPLICATION

This application claims priority from European Patent Application No. 17305600.3, entitled "METHOD AND DEVICE FOR DETERMINING A CHARACTERISTIC OF A DISPLAY DEVICE", filed on May 23, 2017, the contents of which are hereby incorporated by reference in its entirety.

2. TECHNICAL FIELD

The present disclosure relates to the domain of image processing, for example in the context of augmented reality consumed on a mobile device such as for example a tablet, a smartphone or a head-mounted display (HMD).

3. BACKGROUND ART

Augmented reality applications are becoming popular as they allow to improve the user experience while consuming various kinds of content. One aspect of augmented reality is the compositing of a real scene with virtual objects in videos, which represents some challenges as the virtual object needs to look real. When for example a user is capturing a video using a device (for instance a tablet) from a scene, which contains a display device (for instance a TV) displaying another video (for example a broadcasted video), compositing virtual objects in the captured video, in relation to the displayed broadcasted video represents a set of unresolved challenges. Indeed, compositing such a real scene with a virtual object related to a video displayed in the real scene, without considering any characteristic of the display device will lack of realism, as the inserted virtual object will not look real in the augmented video. Some methods are needed to determine the characteristics of a display device, displaying the video being included in the captured video, to take them into account in the compositing of the real scene with related virtual objects.

4. SUMMARY

In situation where a capturing device is capturing a first image of a scene comprising a display device displaying a second image, a salient idea is to send both the captured first image and the second image, being displayed by the display device to a processing device, for comparatively processing the first and the second image to determine a characteristic associated with the display device. Being able to process the first image (comprising a displayed second image) together with the original second image advantageously allows to determine various characteristics associated with the display device that altered the displayed second image within the first image, making it different from the initial second image. Characteristics associated with the display device are for example a specular reflection occurring on the display device in the scene and disturbing the capture of the scene. In a second and non-limiting example a characteristic of the display device is the color reproduction function of the display device that makes the displayed second image within a displayed first image be different from the displayed second image in the scene.

To that end, a method for determining a characteristic of a display device is disclosed. The method comprises:

receiving a first image of a scene, the scene comprising the display device displaying a second image;
receiving the second image;
determining the characteristic of the display device, responsive to a comparison of the first and second images.

According to a particularly advantageous variant, the method further comprises obtaining a geometric transform by matching the second image to a region of the first image.

According to another particularly advantageous variant, the method further comprises obtaining the region of the first image by detecting the display device in the first image prior to the matching.

According to another particularly advantageous variant, the comparison of the first and second images comprises comparing the region of the first image with the second image based on the geometric transform.

According to another particularly advantageous variant, the characteristic of the display device is a specular reflection on the display device, the specular reflection being represented for example by elements of the first image for which colors have larger color values or different hue or different saturation than colors of corresponding elements in the second image.

According to another particularly advantageous variant, the method further comprises removing the determined specular reflection from the first image.

According to another particularly advantageous variant, the characteristic of the display device is a color reproduction function of the display device (12), the color reproduction function being determined from a color characteristic of for example a device capturing the scene and the comparison of the first and the second images.

According to another particularly advantageous variant, the device capturing the scene is further displaying the first image, and the device displaying the first image is calibrated according to the determined color reproduction function.

According to another particularly advantageous variant, the device capturing the scene is further receiving the second image.

In a second aspect, a capturing device for determining a characteristic of a display device is also disclosed. The capturing device comprises:

a camera for capturing a first image of a scene, the scene comprising the display device displaying a second image;
a network interface for receiving the second image;
processing means configured to determine the characteristic of the display device, responsive to a comparison of the first and second images.

According to a particularly advantageous variant, the processing means are further configured to obtain a geometric transform by matching the second image to a region of the first image.

According to another particularly advantageous variant, the characteristic of the display device is one among a specular reflection on the display device and a color reproduction function of the display device.

In a third aspect, a capturing device for determining a characteristic of a display device is also disclosed. The capturing device comprises:

a camera for capturing a first image of a scene, the scene comprising the display device displaying a second image;
a network interface for receiving the second image;

a processor configured to determine the characteristic of the display device, responsive to a comparison of the first and second images.

According to a particularly advantageous variant, the processor is further configured to obtain a geometric transform by matching the second image to a region of the first image.

According to another particularly advantageous variant, the characteristic of the display device is one among a specular reflection on the display device and a color reproduction function of the display device.

In a fourth aspect, a processing device for determining a characteristic of a display device is also disclosed. The processing device comprises at least one network interface configured to:

receive a first image of a scene, the scene comprising the display device displaying a second image;

receive the second image;

the processing device further comprises processing means configured to determine the characteristic of the display device, responsive to a comparison of the first and second images.

According to a particularly advantageous variant, the processing means are further configured to obtain a geometric transform by matching the second image to a region of the first image.

In a fifth aspect, a processing device for determining a characteristic of a display device is also disclosed. The processing device comprises at least one network interface configured to:

receive a first image of a scene, the scene comprising the display device displaying a second image;

receive the second image;

the processing device further comprises processor configured to determine the characteristic of the display device, responsive to a comparison of the first and second images.

According to a particularly advantageous variant, the processor is further configured to obtain a geometric transform by matching the second image to a region of the first image.

In a sixth aspect, a computer program product for determining a characteristic of a display device is also disclosed. The computer program product comprises program code instructions executable by a processor for performing the method implemented in any of its variant.

In a seventh aspect, a computer-readable storage medium storing computer-executable program instructions for determining a characteristic of a display device is also disclosed. The computer-readable storage medium comprises instructions of program code executable by at least one processor to perform the method implemented in any of its variant.

While not explicitly described, the present embodiments may be employed in any combination or sub-combination. For example, the present principles are not limited to the described variants, and any arrangement of variants and embodiments can be used. Moreover, the present principles are not limited to the described display characteristic examples and any other type of characteristic associated with a display device is compatible with the disclosed principles. The present principles are not further limited to the described image matching, device detection, image comparison techniques.

Besides, any characteristic, variant or embodiment described for a method is compatible with a device comprising means for processing the disclosed method, with a device comprising a processor configured to process the disclosed method, with a computer program product comprising program code instructions and with a computer-readable storage medium storing program instructions.

6. DESCRIPTION OF EMBODIMENTS

The present principles are applicable to applications related to the processing and/or the capture of a first image of a scene wherein the scene comprises a display device displaying a second image. Various effects may alter the second image once it is included in the first image. For example, it is not rare in a scene with artificial illumination, such as indoor environment, that more than one source of illumination is present resulting in complex light interactions. Typically, light interactions with object surfaces include diffuse reflections, specular reflections, shading and cast shadows. Especially, on a glossy surface of a screen of a display device (such as for example a television or a tablet), specular reflections will occur that disturb watching and/or capturing the display device while images being displayed by the display device. For example, specular reflections will cause the human visual system to lower its sensitivity and details in the images on a screen surface are less visible for the user. Determining a specular reflection associated with the display device is useful to applications related to the capture of images of a scene including the display device, as the specular reflection can be further leveraged by those applications.

In another example, a display device displays colors according to its device specific color reproduction function. In case the first image of the scene (comprising the display device displaying the second image) is further displayed, for example by the device capturing the first image (e.g. in case of a tablet), the capturing device will display colors according to its own device specific color reproduction function, possibly different from the display device color reproduction function. A user looking both at the second image displayed by the display device in the scene and at the captured, first image such as displayed by the capturing device is very likely to notice a difference in color display between both displays of the second image. The reason is that different display manufacturers use different display technologies and apply different signal processing. Determining a color reproduction function associated with the display device is useful to applications related to the capture of images of a scene including the display device, as the knowledge of the color reproduction function of the display device can be further leveraged by those applications.

A specular reflection and a color reproduction function are exemplary and non-limiting characteristics of a display device and any other characteristic of or associated with a display device is applicable to the present principles.

Figure 1A:
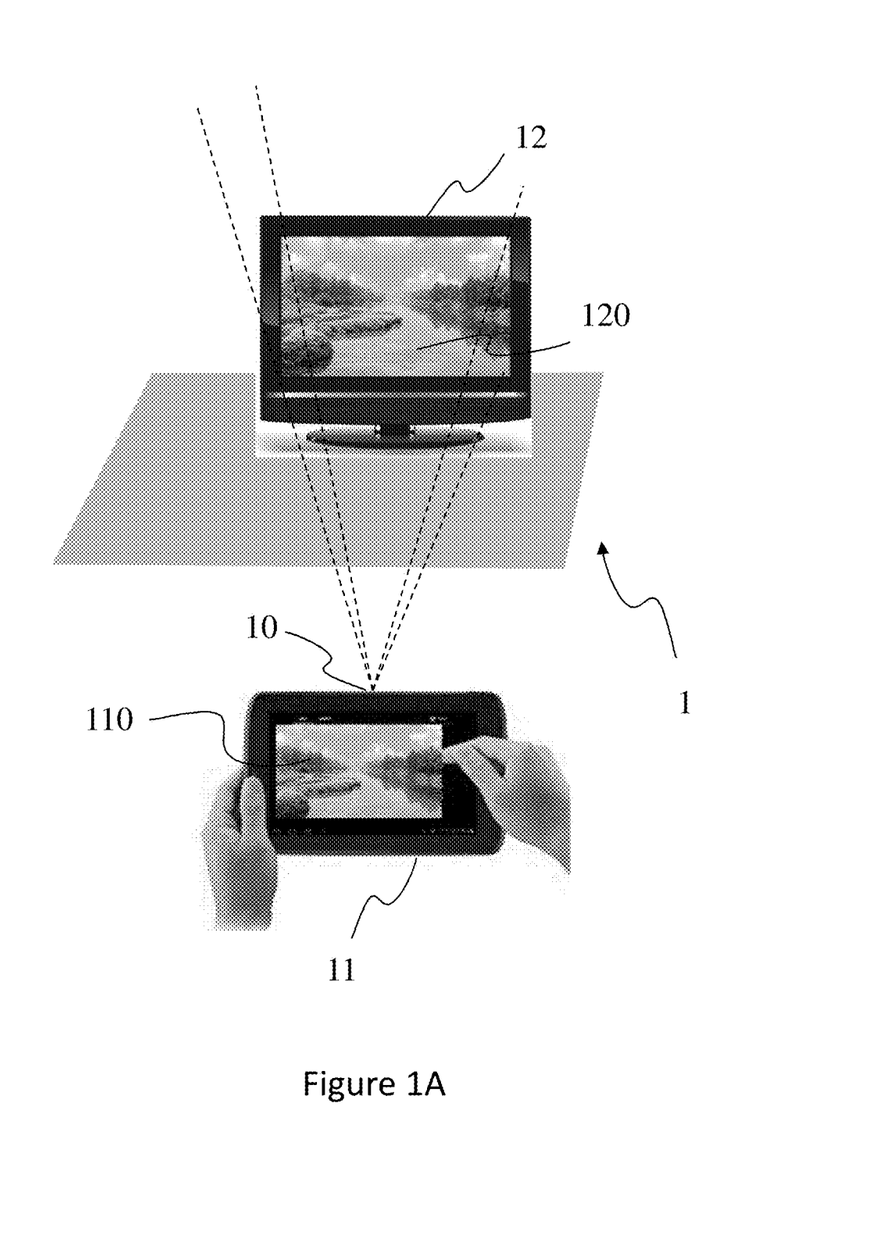
FIGS. 1A and 1B illustrate two particular and non-limiting examples of a first image of a real scene, captured by a device, the scene comprising a display device displaying a second image, according to the present principles.
Figure 1B:
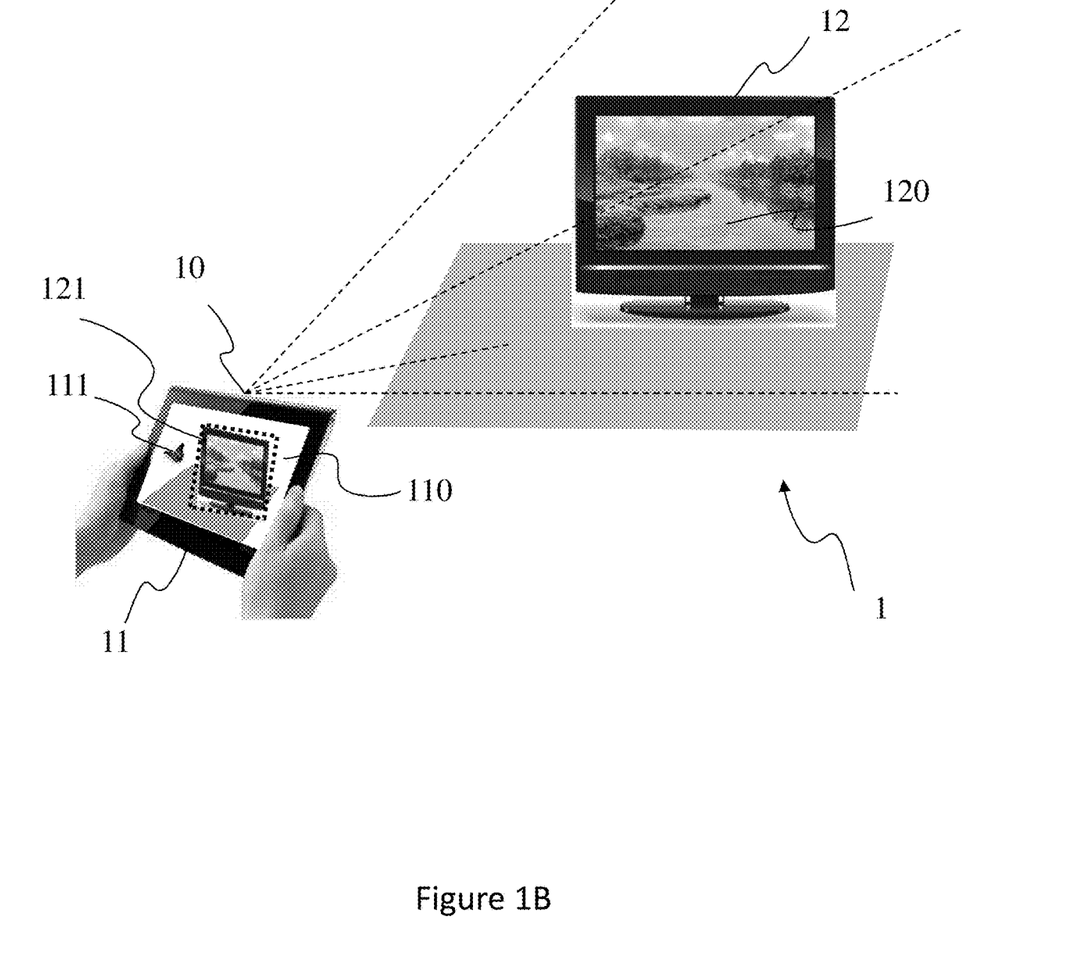

FIGS. 1A and 1B illustrate two examples of a first image 110 of a real scene 1, captured by a device 11, the scene comprising a display device 12 displaying a second image 120, according to a particular and non-limiting example of the present principles. In both illustrative examples, the device 11 is a tablet displaying the first image 110.

The first image 110 is obtained by acquiring a real scene 1, for example with the rear camera 10 of the device 11. The view of the real scene 1 contained in the first image 110 depends for example from the field of view (or the focal) of the camera 10 represented with dashed lines. In a first example (represented in FIG. 1A) the field of view restricts the acquisition of the real scene to the second image 120 being displayed by the display device 12, in such a way that no other element is present in the first image 110. In a second example represented in FIG. 1B, the first image 110 is a standard field-of-view image (e.g., 65°, 70° or 90°), or a large field-of-view image (up to 360°, e.g. 110°, 135°, 180°, 240° or 360°). The real scene 1 of FIG. 1B comprises a single display devices 12 (e.g. a television set). The display device 12 being part of the scene 1 captured by the device 11, is comprised in a region 121 of the first image 110. In another example (not represented) the display device 12 is partly occluded and the visible part of display device 12 is comprised in a region 121 of the first image 110. In other examples (not represented), the real scene comprises more than one display device and/or a display screen associated with a projector and/or a smartphone and/or a tablet). Optionally (depending from the scene and the field of view) one or more other elements (not illustrated on FIG. 1B) depending from the nature of the real scene (e.g. a living room, a bedroom, a dining room, . . . ) are also present in the real scene 1. According to a variant, the first image 110 of the scene 1 is acquired with a camera that is not embedded in the device 11, e.g. a webcam or a security camera. In this case, the first image 110 is transmitted via a communication link to the device 11 (not shown in FIGS. 1A and 1B).

The first image 110 may be a still image, an image of a first video sequence comprising a sequence of first images, or a 3D image, for example a light field. Alternatively, or additionally, the second image 120 may also be a still image or an image of a second video sequence comprising a sequence of second images. For example, the second video may be a broadcast video received by the display device 12 from a broadcast or broadband network. The second video may also be locally played out from a player connected or embedded to the display device 12. The second image may also be an image of a multiple set of images, for example the left image of a stereo image pair. For the sake of clarity and simplicity the present principles are described by applying operations on a first and a second images, but considering a first and a second video sequences of respectively first images and second images, the present principles are applicable to first images of the first video sequence and to second images of the second video sequence. Considering 3D imaging, a first and a second set of respectively first images and second images, the present principles are applicable to first images of the first set and to second images of the second set.

In the illustrative example of FIG. 1B, a virtual object 111 (e.g., a butterfly in FIG. 1B) is inserted in the first image 110 before display on the tablet 11. The virtual object 111 is further inserted to other first images of the first video sequence (not represented) for creating a special effect related to the second video sequence. For example, and without limitation, the virtual butterfly 111 is inserted in the first images of the first video sequence for creating the illusion it is flying out of the display device 12. In case a specular reflection is present on the display device 12 from the view point of the device 11, the specular reflection is advantageously taken into account in the insertion of the virtual butterfly in order to increase the realism of the visual effect. Taking the specular reflection into account for example comprises removing the specular reflection from the first image 110. In another example, taking the specular reflection into account comprises applying appropriate light effects to the virtual butterfly that correspond to the specular reflections on display device 12.

Figure 2:
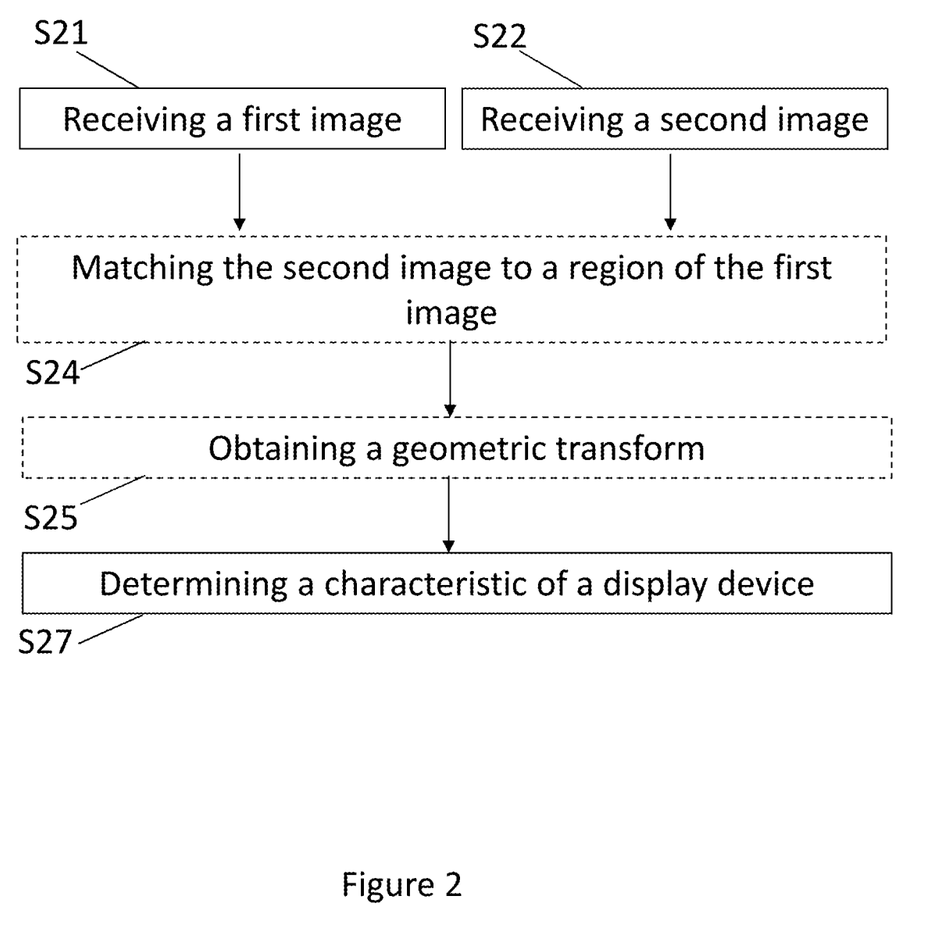
FIG. 2 depicts a method for determining a characteristic associated with a display device according to a specific and non-limiting embodiment of the present principles.

FIG. 2 depicts a method for determining a characteristic associated with a display device according to a specific and non-limiting embodiment of the present principles. As mentioned above and without limitation the characteristic associated with the display device is a specular reflection or a color reproduction function of the display device.

In the step S21 a first image 110 of a real scene is received by a processing device. The scene comprises a display device 12 displaying a second image 120. The first image 110 of the scene is captured by a device 11.

In the step S22, the second image 120, displayed on the display device 12 is further received by the processing device from a network interface. In a first example the second image 120 is received by the processing device from the display device 12. In another example the second image is 120 is received by the processing device from a network device, for instance transmitting the second image to both the display device 12 and the processing device.

In an advantageous variant, the processing device is the device 11 capturing the first image 110 of the scene. In another variant, the processing device is receiving the first image from another capturing device for example via a network interface. In that variant, the processing device receives both the first image 110 and the second image 120, from one or several network interfaces.

In the step S27 a characteristic associated with the display device 12 is determined responsive to a comparison of the first and the second images. The comparison comprises for example a pixel per pixel comparison between the first and the second image. In another example, the comparison corresponds to the comparison of local features computed on small patches in each image as these features can be more tolerant to registration errors. In a first variant, a comparison of the first and the second images comprises subdividing the first and second images into rectangular blocs, determining mean and standard deviation values of image color values of corresponding blocks of the first and the second images, and comparing them. In a second variant, the comparison of the first and the second images comprises identifying image regions with low texture in the first and the second images, and associating regions of respectively the first and the second images by similar principal color. According to the second variant, the comparison comprises comparing pixel values of the associated regions of the first and of the second images. In yet another variant, the pixels of the first image are photometrically compensated before being compared to the pixels of the second image. An example for a photometrical compensation is the application of an offset to the color values of the pixels of the first image before comparison with the pixels of the second image such that the mean of color values of the pixels of the first image are identical to the mean of the color values of the second image.

In case the characteristic of the display device 12 is a specular reflection on the display device, the specular reflection being visible from the view point of the device capturing the first image, the specular reflection may be represented by elements of the first image for which color values are larger than color values of corresponding elements in the second image. This specular reflection may also be represented by elements of the first image for which the hue and saturation of colors are different than colors of corresponding elements in the second image. Elements are for example and without limitation a pixel, a sub-pixel, a block, a region or a set of pixels.

Determining the specular reflection associated with the display device comprises selecting those elements of the first image (i.e. for example for which color values are larger than color values of corresponding elements in the second image). Determining the specular reflection on the display device is advantageous as the specular reflection can be eliminated using well-known in painting processing. Another possibility is to overlay elements of the second image on elements of the first image where specular reflection has been identified. Determining the specular reflection on the display device is further advantageous as it can be taken into account by augmented reality applications related to the display device and/or the second image. For example, from the orientation of the screen of the display device and the determined specular reflection, a direction of illumination can be determined. From this direction and the surface properties of the virtual objects, specular reflection can be advantageously created on the surface of the virtual objects.

In case the characteristic of the display device 12 is a color reproduction function of the display device, the color reproduction function of the display device is determined from a comparison of the first and the second images. In case of trichromatic color reproduction, a color is expressed by three color values, also called color coordinates. For example, each pixel of a second image displayed on the display device 12 is then associated to three color coordinates $(R_2,G_2,B_2)$. More precisely, the color reproduction function of the display device 12 is for example defined as the function $(X,Y,Z)=f_{12}(R_2,G_2,B_2)$ that describes the reproduction of a color encoded by device dependent color coordinates $(R_2,G_2,B_2)$ (related to the display device 12, displaying the second image 120) into a color specified by device independent color coordinates $(X,Y,Z)$. A color characteristic of the capturing device (being a manufacturer provided parameter of the capturing device) is further defined as the function $(R_1,G_1,B_1)=g(X,Y,Z)$ that describes the capture of a color specified in the device independent color coordinates $(X,Y,Z)$ and its description by device dependent color coordinates $(R_1,G_1,B_1)$ related to the capturing device. As the first image 110 corresponds to an image captured by the device 11 (called capturing device), the colors of the first image 110 are stored (for example in a memory of the processing device) in the capturing device dependent color coordinates $(R_1,G_1,B_1)$. As the second image 120 (received by the processing device) corresponds to an image displayed by the display device 12, the colors of the second image are stored (for example in a memory of the processing device) in the display device dependent color coordinates $(R_2,G_2,B_2)$.

Determining the color reproduction function $f_{12}( )$ of the display device comprises calculating for each captured color, its device independent color coordinates $(X,Y,Z)= g^{-1}(R_1,G_1,B_1)$ ($g^{-1}$ being the inverse function of the capturing device color characteristic g). The color reproduction function $f_{12}( )$ of the display device 12 is thus obtained from the capturing device color characteristic g and a comparison of corresponding colors of the first $(R_1,G_1,B_1)$ and the second $(R_2,G_2,B_2)$ images in respectively the capturing device dependent coordinates and the display device dependent coordinates according to the following equation:

$$(X,Y,Z)=f_{12}(R_2,G_2,B_2), \text{ being equivalent to } g^{-1}(R_1,G_1,B_1)=f_{12}(R_2,G_2,B_2).$$

The color reproduction function $f_{12}( )$ can be obtained from the above equation in different ways. In a first example, one equation is derived from one pair of corresponding colors $(R_1,G_1,B_1)$ and $(R_2,G_2,B_2)$, and $f_{12}( )$ is modeled by a linear function $(X,Y,Z)=f_{12}(R_2,G_2,B_2)=(a\ R_2, b\ G_2, c\ B_2)$. In this example, the parameters of the color reproduction function $f_{12}( )$ are obtained by that one equation resulting in $a=X/R_2$ and $b=Y/G_2$ and $c=X/B_2$. If more equations are available, $f_{12}( )$ can be modeled with more parameters, for example as a matrix, a polynomial, an exponential function, or a splines curve.

In case the device 11 is displaying the first image 110, determining the color reproduction function of the display device 12 is advantageous as it allows to calibrate the device 11 displaying the first image 110 such that it has the same color reproduction as the display device 12 of the scene, up to the capacities of color reproduction of the device. The color reproduction of the device 11 is known as a manufacturer provided parameter. In this advantageous variant, the color reproduction of the device 11 (displaying the first image) is defined as the function $(X,Y,Z)=f_{11}(R_1',G_1',B_1')$ that describes the reproduction of a color encoded by the device dependent color coordinates $(R_1',G_1',B_1')$ into a color specified by the device independent color coordinates $(X,Y,Z)$.

In this advantageous variant, the device 11 (displaying the first image) having the color reproduction function $f_{11}( )$ is calibrated such that it behaves according to a color reproduction function $f_{11}'( )$ that is equal to $f_{12}( )$, up to limits of color reproduction of the device (displaying the first image). Therefore, a calibration function well known in the state of art is applied to device dependent color coordinates $(R_2,G_2,B_2)$ resulting in calibrated device dependent color coordinates $(R_1',G_1',B_1')$, according to the equation:

$$(R_1',G_1',B_1')=f_{11}^{-1}(f_{12}(R_2,G_2,B_2)).$$

These calibrated color coordinates are used by the device 11 to reproduce a color. In other words a color transformed image of the first image is obtained according to the color reproduction function $f_{11}'( )$ and the device 11 displays the color transformed image. Note that that such a calibration function is operational up to the limits of color reproduction of the device. For example, if a color $(X,Y,Z)=f_{12}(R_2,G_2,B_2)$ cannot be reproduced by the device, $f_{11}^{-1}( )$ needs to be replaced by known methods such as color clipping or color gamut mapping.

There may also be more than one characteristic associated with the display device 12. For example, if two characteristics of the display device 12 are a color reproduction function of the display device and specular reflection on the display device, the color reproduction function can be used to calibrate the second image as described above. Then, pixels of the calibrated second image are compared to pixels of the first image as described above for comparing pixels of the second image to pixels of the first image in order to identify specular reflections. Also, elements of the calibrated second image may be overlaid on the first image such as described above for overlaying elements of the second image on the first image in order to eliminate specular reflections.

In an optional step S24, the second image 120 is matched to a region of the first image 110. In situations, as for example illustrated in FIG. 1B, where the displayed second image 121 is only a part of the first image 110, a matching of the second image 120 to the first image 110 allows to determine a region 121 of the first image 110 corresponding to the displayed second image within the first image. Matching the second image to the first image comprises obtaining first features in the first image and second features in the second image. First and second features, characterized for example by a location, a size, an orientation and a color are obtained by methods known to the skilled in the art such as for example the SIFT (Scale Invariant Feature Transfer) method proposed by Lowe in the paper entitled "Distinctive image features from scale-invariant key points" and published in the Intl Journal of Computer Vision in 2004. Feature matching is for example obtained by computing Euclidean distances between a second feature and each first feature of a set of first features, and selecting the first feature with the shortest distance to the second feature as the matching second feature to the first feature. Any technique for matching the second image to a region of the first image is compatible with the disclosed principles. From the feature matching, an initial set of feature correspondences is obtained, each feature correspondence comprising a first feature of the first image matching a second feature of the second image. Optionally the initial set of feature correspondences is enhanced by known methods such as the nearest neighbor distance ratio (NNDR) such as the article of Mikolajczyk et al entitled "A performance evaluation of local descriptors" published in 2004 in the IEEE Trans. on Pattern Analysis and Machine Intelligence. Feature correspondences may be optionally further enhanced by detecting outliers using the RANSAC method as described by Fischler et al. in the paper entitled "Random sample consensus: A paradigm for model fitting with applications to image analysis and automated cartography" published in the Communications of the ACM in 1981. By abandoning unprecise correspondences and outliers, a final set of feature correspondences is obtained.

The region of the first image corresponding to the displayed second image is the part of the first image containing the first features of the first image matching second features of the second image, in any of the above optional variant.

In an optional step S25 a geometric transform is obtained based on the feature matching. Indeed, each correspondence delivers a location $x_1,y_1$ in the first image that corresponds to a location $x_2,y_2$ in the second image. From the corresponding locations, a geometric transform, also called a geometric distortion is calculated, according to for example an homography H that assumes that the display of the first device is plane. A homography is calculated for example following the method disclosed by Ondrej Chun et al in "Homography estimation from correspondences of local elliptical features", published in the Proceedings of the Pattern Recognition International Conference in 2012 (IPCR). The homography transforms any location $x_1,y_1$ to the corresponding location $x_2,y_2$ or vice versa. Any geometric transform, other than an homographic transform is compatible with the disclosed principles.

In situations, where the displayed second image 121 is only a part of the first image 110, and where the first image comprises other objects than the displayed second image 121, the characteristic of the display device is advantageously determined from a comparison of the second image and the region of the first image, wherein the comparison comprises matching the second image to a region of the first image, obtaining a geometric transform from the matching, and comparatively processing the region of the first image with the second image based on the geometric transform. For example, the region determined at the preceding step is distorted based on a geometric transform, for example the homography as previously described, and the distorted region of the first image is comparatively processed with the second image according to any variant previously described. The geometric transform is used to compensate geometrically the region of the first image such that it geometrically corresponds to the second image. More precisely a distorted region is calculated in the following way: each position $x_{2i},y_{2i}$ of the distorted region of the first image, corresponds to a position in the first image where $0 \leq i < N$ and N the number of pixels of the distorted region of the first image. For all $0 \leq i < N$, if are integers, the color of the first image at location is transferred into the distorted region of the first image at the location $x_{2i},y_{2i}$, if are not both integer, the nearest neighbor locations are determined, and a color is interpolated from the colors at these nearest neighbor locations in the first image and the interpolated color is transferred into the distorted region of the first image at the location $x_{2i},y_{2i}$. In a variant, the second image is distorted based on the geometric transform to compensate geometrically the second image such that it geometrically corresponds to the region of the first image. In this case, the region of the first image is comparatively processed with the distorted second image according to any variant previously described.

In yet another variant, the distorted image is not created. Instead, the points $x_{1i},y_{1i}$ corresponding to pixels of the second image are identified via the geometric transformation, and their color values are computed via bilinear interpolation. Interpolated color values of the first image are then further compared to corresponding color values of the second image using for example, a pel-by-pel comparison or a local feature computation.

In case the characteristic of the display device 12 is a specular reflection on the display device, the specular reflection is determined from a comparison of the second image with the distorted region of the first image. In a variant, the specular reflection is determined from a comparison of the region of the first image with the distorted second image, as previously described.

In case the characteristic of the display device 12 is a color reproduction of the display device, and in case the device 11 is displaying the first image, the color reproduction function is determined from a comparison of corresponding colors of the distorted region of the first $(R_1,G_1,B_1)$ image and the second $(R_2,G_2,B_2)$ image in respectively the capturing device dependent coordinates and the display device dependent coordinates according to the equation previously described.

In case the device 11 is calibrated according to the reproduction function of the display device 12, a color transformed image or calibrated image of the first image is obtained according to the calibration function $f_{11}^{-1}(f_{12}(\ ))$ based on the color reproduction function $f_{11}'(\ )$, and the device 11 displays the color transformed image. In a first variant, the calibration function $f_{11}^{-1}(f_{12}(\ ))$ is applied to the whole first image 110 for obtaining the color transformed image. In a second variant, the calibration function $f_{11}^{-1}(f_{12}(\ ))$ is applied only to the region of the first image, without transforming the colors outside of the region, for obtaining the color transformed image.

In an advantageous and optional embodiment, the region of the first image corresponding to the displayed second image in the first image is obtained prior to the matching step by a detection of the display device in the first image.

In that optional embodiment, the display device is detected in the first image, resulting in a region corresponding to the displayed second image in the first image. In a first variant, the display device displays a white second image, or sequence of white second images, as the first image is captured. The contour of the region corresponding to the displayed second image is determined by identifying within the second image the contour of the white second image. Four lines are then obtained, which correspond to the limits of the region of the first image. In a second variant, the display device is detected using known object recognition methods learned to detect display devices, independently from the displayed second images. In a third variant, in case the display device is displaying a second video sequence comprising moving content, and the first video is acquired from a fairly static device, the display device showing the moving content is detected by identifying dominant differences between the first images of the first video sequence. The area in the first images corresponding to the dominant differences corresponds to the region of the first image that shows the second images displayed by the display device. Any other technique for detecting a display device in an image is compatible with the disclosed principles.

In case a first and a second video sequences are received by the device, the second video sequence being displayed by the display device, temporal synchronization between both video sequences is performed to synchronize a first image of the first video sequence with a second image of the second video sequence prior to the optional steps S24, S25 and the step S27. In case the second video sequence is a repetition of a same single still image, no temporal synchronization is necessary. In case the second video sequence is a sequence of moving images, temporal synchronization performed by for example exchanging synchronization signaling data between the device and the display device. In a variant, a preliminary temporal synchronization between both video sequences is performed before the optional matching step S24. In another variant, no preliminary temporal synchronization is performed before the optional matching step S24. In that case the optional matching step S24 is extended to achieve synchronization. For example, feature matching between the second image and a region of the first image is done for each second image out of a sequence of second images. Temporal synchronization is achieved by selecting the second image that allows a best matching of features, the quality of feature matching being evaluated using known matching criteria such as for example a minimum sum of quadratic differences between pixels.

In yet another embodiment, the characteristic associated with the display device 12 is the delay of video display, for example caused by the user pushing "pause" and then "play". According to this embodiment, the first device is receiving the second video as a sequence of second images, from a network. By matching a specific second image within (a region of) the first image, the delay of video display of the display device 12 is determined. For the determination of this characteristic, obtaining a geometrical transform is not required.

Figure 3:
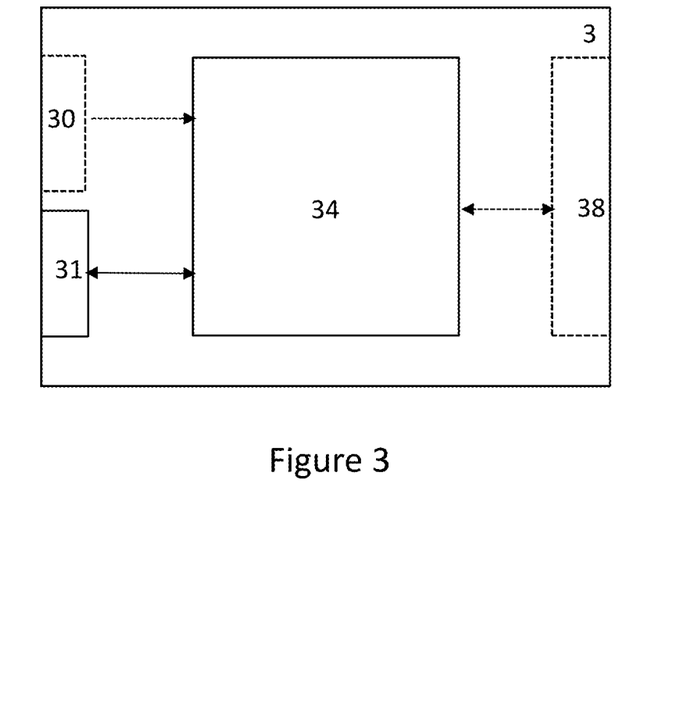
FIG. 3 represents a processing device for determining a characteristic associated with a display device according to a specific and non-limiting embodiment.

FIG. 3 depicts a processing device 3 for determining a characteristic associated with a display device displaying a second image. According to a specific and non-limiting embodiment of the principles, the processing device 3 comprises at least one network interface 31, configured to receive a first image of a scene, the first image being captured by a capturing device, the scene comprising the display device displaying the second image. For example, the processing device 3 receives the first image from the capturing device over a first network. The network interface 31 is further configured to receive a second image from a second network. According to different embodiments of the principles, the first and the second networks are a same network or different networks. According to different embodiments of the principles, the at least one network interface 31 belongs to a set comprising:

- a WAN (Wide Area Network) interface such a 2G/3G/4G cellular networks, WiMax interface;
- a WLAN (Wireless Local Area Network) interface such as Bluetooth, WiFi, or any kind of wireless networking interface;
- a wired interface such as Ethernet, USB, FireWire, or any kind of wired technology further enabling a data communication between the processing device 3 and at least one device;
- a WAN (Wide Area Network) interface such a 2G/3G/4G cellular networks, WiMax interface.

According to different embodiments the first and second images are received over a same network interface (for example Wi-Fi) or over different network interfaces (such as for example USB for the first image and Wi-Fi for the second image). More generally any network interface allowing the processing device 3 to receive a first and a second image, is compatible with the disclosed principles.

According to a specific and non-limiting embodiment of the principles, the processing device 1 comprises an optional camera 30 configured to capture a first image of the scene, the scene comprising the display device displaying a second image. According to a specific and non-limiting embodiment of the principles the camera 30 comprises a lens used to focus the light and direct it towards a semi-conductor image capture device, such as for example a CCD (Charge Coupled Device) captor or a CMOS (Complementary Metal Oxide Semiconductor) captor that measures the light with a matrix of thousands or millions of minuscule photo-sensitive diodes called photo-sensitive cells. According to a specific and non-limiting embodiment of the principles the camera 30 is external to the processing device 3. According to a specific and non-limiting embodiment, the camera is prepared to take multiple images, for example a stereo camera capturing left and right view or a lightfield camera capturing sub aperture images and processes them into multiple views.

The network interface 31 and the optional camera 30 are linked to a processing module 34 configured to determine a characteristic associated with the display device, responsive to a processing of the first and second images. According to a particular embodiment the processing module 34 is further optionally configured to process the first image taking into account the determined characteristic of the display device, and to send the processed first image to a display mean via an optional output 38. According to a particular embodiment the display means is external to the device and the optional output 38 sends the processed first image to an external display means. According to different embodiments of the disclosed principles, the display means, internal or external, belongs to a set comprising:

- a personal computer screen;
- a TV screen;
- a tablet screen;
- a smartphone screen;
- a wearable display;
- a head mounted display device;
- smart glasses.

More generally any display means allowing to display a processed first image, is compatible with disclosed principles.

According to a particular embodiment the processing module 34 sends the processed first image to an external device via the network interface 31, for various purposes such as for example for remote storage, for further video editing, or for further network transmission by means of a delivery network.

Figure 4:
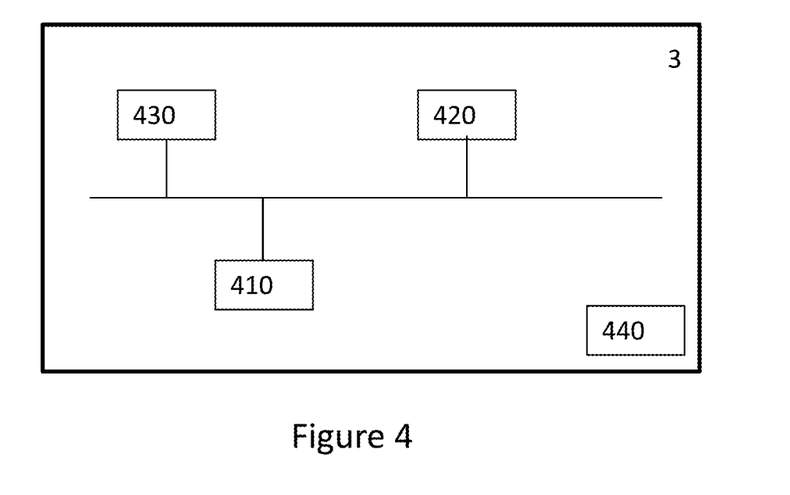
FIG. 4 represents an exemplary architecture of the processing device of FIG. 3 according to a specific and non-limiting embodiment.

FIG. 4 represents an exemplary architecture of the processing device 3 according to a specific and non-limiting embodiment, where the processing device 3 is configured to determine a characteristic associated with a display device. The processing device 3 comprises one or more processor(s) 410, which is(are), for example, a CPU, a GPU and/or a DSP (English acronym of Digital Signal Processor), along with internal memory 420 (e.g. RAM, ROM, EPROM). The processing device 3 comprises one or several Input/Output interface(s) 430 adapted to send to display output information and/or to allow a user to enter commands and/or data (e.g. a keyboard, a mouse, a touchpad, a webcam, a display), and/or to send/receive data over a network interface; and a power source 440 which may be external to the processing device 3.

According to an exemplary and non-limiting embodiment, the processing device 3 further comprises a computer program stored in the memory 420. The computer program comprises instructions which, when executed by the processing device 3, in particular by the processor 410, make the processing device 3 carrying out the processing method described with reference to FIG. 2. According to a variant, the computer program is stored externally to the processing device 3 on a non-transitory digital data support, e.g. on an external storage medium such as a SD Card, HDD, CD-ROM, DVD, a read-only and/or DVD drive and/or a DVD Read/Write drive, all known in the art. The processing device 3 thus comprises an interface to read the computer program. Further, the processing device 3 could access one or more Universal Serial Bus (USB)-type storage devices (e.g., "memory sticks.") through corresponding USB ports (not shown).

According to exemplary and non-limiting embodiments, the processing device 3 belongs to a set comprising:
- a smartphone;
- a tablet;
- an e-book reader,
- a digital camera
- a tablet computer;
- a laptop computer;
- a see-through display device;
- a head mounted display device;
- a desktop computer;
- a server;
- a gateway;
- a set-top-box.

The invention claimed is:

1. A method, performed by a single first display device, the method comprising:
    capturing a first image of a scene by the single first display device via a camera embedded in the single first display device, the scene comprising a second display device displaying a second image, the second display device being separate from the single first display device;
    receiving the second image from a network;
    determining a characteristic of the second display device, responsive to a comparison of the first and the second images;
    automatically modifying the first image based on the determined characteristic; and
    displaying the modified first image on the first display device.

2. The method according to claim 1, further comprising obtaining a geometric transform by matching the second image to a region of the first image.

3. The method according to claim 2, further comprising obtaining the region of the first image by detecting the second display device in the first image prior to the matching.

4. The method according to claim 2, wherein the comparison of the first and second images comprises comparing the region of the first image with the second image based on the geometric transform.

5. The method according to claim 1, wherein the characteristic of the second display device is a specular reflection on the second display device.

6. The method according to claim 5, further comprising removing the determined specular reflection from the first image.

7. The method according to claim 1, wherein the characteristic of the second display device is a trichromatic color reproduction function of the second display device, the trichromatic color reproduction function being determined from a color characteristic of the first display device and the comparison of the first and the second images.

8. The method according to claim 7, wherein the first display device is calibrated according to the determined trichromatic color reproduction function.

9. The method of claim 5, further comprising inserting a virtual object in an area of the first image before display of the first image, the area corresponding to the second display device, the virtual object being inserted based on the determined specular reflection.

10. The method of claim 1, further comprising inserting a virtual object in an area of the first image before display of the first image, the area corresponding to the second display device, the virtual object being inserted based on the determined characteristic.

11. The method of claim 1, further comprising inserting a virtual object in an area of the first image before display of the first image, the area corresponding to the second display device, wherein a light effect is applied to the virtual object based on the determined characteristic.

12. A single first display device comprising:
    a camera configured to capture a first image of a scene, the scene comprising a second display device displaying a second image, the second display device being separate from the single first display device;
    a network interface configured to receive the second image; and
    a processor configured to:
        determine a characteristic of the second display device, responsive to a comparison of the first and the second images,
        automatically modify the first image based on the determined characteristic, and
        display the modified first image on the first display device.

13. The first display device according to claim 12, wherein the processor is further configured to obtain a geometric transform by matching the second image to a region of the first image.

14. The first display device according to claim 13, wherein the processor is further configured to obtain the region of the first image by detecting the second display device in the first image prior to the matching.

15. The first display device according to claim 13, wherein the comparison of the first and second images comprises comparing the region of the first image with the second image based on the geometric transform.

16. The first display device according to claim 12, wherein the characteristic of the second display device is a specular reflection on the second display device.

17. The first display device according to claim 16, wherein the processor is further configured to remove the determined specular reflection from the first image.

18. The first display device according to claim 12, wherein the characteristic of the second display device is a trichromatic color reproduction function of the second display device, the trichromatic color reproduction function being determined from a color characteristic of the first display device and the comparison of the first and the second images.

19. The first display device according to claim 18, wherein the first display device is calibrated according to the determined trichromatic color reproduction function.

20. The first display device of claim 16, wherein the processor is further configured to insert a virtual object in an area of the first image before display of the first image, the area corresponding to the second display device, the virtual object being inserted based on the determined specular reflection.

21. The first display device of claim 12, wherein the processor is further configured to insert a virtual object in an area of the first image before display of the first image, the area corresponding to the second display device, the virtual object being inserted based on the determined characteristic.

22. The method of claim 12, further comprising inserting a virtual object in an area of the first image before display of the first image, the area corresponding to the second display device, wherein a light effect is applied to the virtual object based on the determined characteristic.

23. A method, performed by a single first display device, the method comprising:
   capturing a first image of a scene by the single first display device via a camera embedded in the single first display device, the scene comprising a second display device displaying a second image, the second display device being separate from the single first display device;
   receiving the second image from a network;
   matching the first image to the second image, comprising obtaining first features in the first image and second features in the second image;
   determining a characteristic of the second display device, responsive to the matching of the first and the second images;
   automatically modifying the first image based on the determined characteristic; and
   displaying the modified first image on the first display device.

24. The method of claim 23, wherein the first and second features comprise at least one of a location, a size, an orientation, a color, a recognized object, a moving object, and a specular reflection.

25. The method of claim 23, further comprising:
   identifying one of more sources of illumination present in the second image,
   wherein automatically modifying the first image comprises modifying the first image to account for the one or more sources of illumination.

* * * * *

UNITED STATES PATENT AND TRADEMARK OFFICE
CERTIFICATE OF CORRECTION

| | |
|---|---|
| PATENT NO. | : 11,138,795 B2 |
| APPLICATION NO. | : 15/987685 |
| DATED | : October 5, 2021 |
| INVENTOR(S) | : Jurgen Stauder, Philippe Robert and Sylvain Duchene |

It is certified that error appears in the above-identified patent and that said Letters Patent is hereby corrected as shown below:

On the Title Page

Item (72) Inventors, Line 1: replace "Montreuil/Ille" with --Montreuil-sur-Ille--

Item (56) OTHER PUBLICATIONS, Line 1: replace "Ambiant" with --Ambient--

In the Claims

Claim 22, Column 15, Line 32: replace "method" with --first display device--

Claim 22, Column 15, Line 32: replace "further comprising inserting" with --wherein the processor is further configured to insert--

Signed and Sealed this
Twentieth Day of September, 2022

Katherine Kelly Vidal
*Director of the United States Patent and Trademark Office*